United States Patent [19]

Svensson et al.

[11] Patent Number: 5,312,602
[45] Date of Patent: May 17, 1994

[54] METHOD FOR PURIFYING IRON OXIDE

[75] Inventors: Karl J. V. Svensson; Bo H. Zander, both of Stora, Sweden

[73] Assignee: A/S Sydvaranger, Norway

[21] Appl. No.: 941,407

[22] Filed: Sep. 8, 1992

[51] Int. Cl.5 .......................... C22B 1/00; C01G 49/00
[52] U.S. Cl. .............................. 423/150.1; 423/150.3; 423/633
[58] Field of Search ........................... 423/150.1, 150.3

[56] References Cited

U.S. PATENT DOCUMENTS 2,875,039  5/1959  Bachmann ...................... 423/150.3

FOREIGN PATENT DOCUMENTS 907864   8/1972  Canada ............................. 423/150.1
1675366  9/1991  Fed. Rep. of Germany .
804679   4/1979  U.S.S.R. .

OTHER PUBLICATIONS

Aldrich Chemical Company, Inc. 1990, p. 767.

Primary Examiner—Mukund J. Shah
Assistant Examiner—P. K. Sripada
Attorney, Agent, or Firm—Rodman & Rodman

[57] ABSTRACT

A method is described for purifying iron oxide, for example, in the form of magnetite or hematite slime, which preferably contains quartz as the impurity. The method comprises calcinating the iron oxide together with alkali carbonate and thereafter leaching with a weak aqueous solution of an acid or a mixture of acids.

8 Claims, No Drawings

METHOD FOR PURIFYING IRON OXIDE

The present invention relates to a method for purifying iron oxide, for example, in the form of magnetite slime or a similar substance, which preferably contains quartz as an impurity.

The enormous development in the electronics industry taking place during the last half century has to a rapidly increasing degree created a need for new raw materials. One such raw material is pure iron oxide ($\alpha$-$Fe_2O_3$) of a pigment fineness for production of hard and soft ferrites.

Currently the major share of industry's need for iron oxides is covered by the ironworks' regeneration system for hydrochloric acid from the pickling baths. The purity requirements are high, but this type of oxide as a rule is sufficiently pure for the production of hard ferrite and for simpler soft ferrite qualities. For soft ferrite the purity requirements are higher, but the oxides mentioned above may in many cases be used. A particularly critical impurity is $SiO_2$. For hard ferrite the requirement is that the content shall not exceed 0.3% and preferably not 0.1%. For soft ferrite, on the other hand, it is required that the content be maximum 0.03% for the poorest qualities and below 0.01% for the better ones. For the very highest quality, a content below 0.007% $SiO_2$ is required. Approximately the same low content is also required with regard to CaO and $Na_2O+K_2O$ for the various qualities. Therefore, in order to fulfill the qualititative requirements for the better and best qualities, it is necessary to subject the pickling solution to extensive purification operations. Interest on the part of the iron industry for undertaking such purification operations, however, is slight. Instead, we have begun to lean away from the pickling process in favor of, for example, sandblasting the material. Today the access to sufficiently pure oxide from the regeneration of pickling solutions is insufficient to meet the needs of the electronics industry.

This currently covers about 65% of the demand. We assume that in the future a progressively smaller portion will be derived from the ironworks' pickling processes.

Of the total consumption for the ferrite industry today, approximately 10% comes from highly enriched iron ore concentrate. The proportion is expected to rise rapidly in the future. With today's enrichment methods it is possible to enrich certain ore types to a purity required for hard ferrite. The greatest difficulty is, in general, to bring the $SiO_2$ content to a sufficiently low level. It does not appear possible to obtain the purity required for soft ferrite by means of enrichment.

It is critical for the electronics industry that there be found sufficient access to the necessary amount of iron oxide at reasonable prices.

Generally, it is easiest to enrich magnetite ores to high purity. However, the electronics industry requires that the raw material be trivalent iron in the form of hematite ($\alpha$-$Fe_2O_3$) or goethite ($\alpha$-FeOOH). Products must consequently be ground down to a specific surface of 3-6 $m^2/g$, measured according to the BET method. If one uses magnetite concentrate as a basis, the magnetite must consequently be oxidized to hematite, which is accomplished expediently by calcinating the magnetite in, for example, a rotary furnace at 850° C.-1000° C. Even with the magnetite ore, it seems impossible to reach the purity requirements that are set for soft ferrites. One method for further purifying the iron oxide is to use the leaching method.

It is known from the literature (cf. Bureau of Mines, Report of Investigation no. 7812) that the $SiO_2$ content in iron ore concentrate can be reduced to a significant degree by leaching in lye (NaOH solution). The disadvantage of this method is that it requires high leaching temperature and strong lye solutions, but still does not yield the low $SiO_2$ contents that are required for soft ferrites.

Another method based on leaching with hydrofluoric acid in combination with nitric acid is described in the Norwegian patent no. 44446. Besides high costs involved in the leaching, this does not achieve the purity requirements that are demanded for soft ferrite production with a magnetite slime with quartz as the impurity.

The present invention provides a method for purifying iron oxide, for example, in the form of magnetite slime or a similar substance, which preferably contains quartz as an impurity. The method is characterized in that the iron oxide is calcinated at 850°-1000° C. together with $Na_2CO_3$ in an amount sufficient to obtain an $Na_2O/(SiO_2+Al_2O_3)$ mole ratio of 0.5-2.0, and thereafter is leached at room temperature with a weak aqueous solution of an acid or a mixture of acids.

Depending on the fineness of the concentrate, the calcination can either be done with a mechanical mixture of the concentrate or the alkali carbonate, or with granules or pellets formed from the mixture.

In the following is given an example of how the method is carried out.

EXAMPLE

The starting material used was a magnetite slime obtained by grinding down a quartz-containing magnetite ore in pebble mills in two stages. The product thus obtained was sifted through a screen with mesh size of 0.2 mm, and the part that passed through the screen was magnetically separated in three stages. The magnetic concentrate was then de-sludged in a hydrocyclone.

The effluent was first concentrated on spirals and the concentrate therefrom was again ground and de-sludged in a hydrocyclone, whereafter it was subjected to amine flotation in order thereafter to be magnetically separated again. The purpose of these operations was to, as far as possible, separate crude particles containing quartz and other silicates from the pure magnetite granules. The product thus obtained, which had a specific surface of about 0.1 $m^2/g$ measured according to the BET method, had the following analysis:

| | |
|---|---|
| $Fe_{tot}$ | 72.00% |
| $SiO_2$ | 0.20% |
| MnO | 0.12% |
| $Al_2O_3$ | 0.04% |
| $TiO_2$ | 0.02% |
| CaO | 0.05% |
| MgO | 0.03% |
| $Na_2O$ | 0.001% |
| $K_2O$ | 0.001% |

As is apparent from the analysis, the $SiO_2$ and CaO content is much too high to be used for the production of soft ferrites.

This magnetite concentrate was ground down to a specific surface of about 3 $m^2/g$, measured according to the BET method, and was mixed with 0.5% soda, calculated on the basis of the weight of the concentrate, and was heated for 2 hours to 900° C. The calcined product was later leached with a weak acid solution consisting of 8 g/l hydrofluoric acid (HF) and 20 g/l hydrochloric acid. The amount of the solution was 4 times the weight of the calcination products. The leaching took place under agitation at room temperature and lasted for 2 hours. Then the leaching product was allowed to sediment, and the leaching solution was decanted. The sediment product was filtered and washed, so that the content of Cl⁻ and F⁻ ions was brought down as low as possible.

After leaching of the washed and filtered product, the product has the following analysis:

| | |
|---|---|
| $SiO_2$ | 0.0090% |
| $Na_2O$ | 0.0075% |
| CaO | 0.0100% |

As indicated above, it fulfills the requirements for the raw material for a high quality soft ferrite.

Other experiments have shown that a suitable soda additive should be such that the mole ratio $Na_2O/(SiO_2+Al_2O_3)$ is approximately 1 or slightly higher. Values down to 0.5 may be allowed, but as a rule yield a poorer result the lower the ratio is. Higher values up to 2 may be allowed, but it most often proves more difficult to reduce the $Na_2$ content in the leached product to an acceptable level. The $SiO_2$ content also, as a rule, becomes higher when the above mentioned mole ratio exceeds 2. At mole ratios lower than 0.5, the $SiO_2$ content also increases.

The calcination should take place at a temperature of 850°-1000° C., partly so that the soda can be melted and will thus more readily react with $SiO_2$, and partly so that the oxidation of the magnetite to hematite will be done relatively quickly and completely.

The leaching may be done with hydrofluoric acid only, but then there is required a solution containing 20 g/l HF, which makes it considerably more expensive. The fact that in this case hydrochloric acid and not sulphuric acid is used is related to the content of CaO in the product, since it forms gypsum with sulphuric acid, which cannot be as readily leached out.

The amount of acid required is a good 10 times the amount required to dissolve out the impurities in the iron oxide. This has to do with the fact that the acid also dissolves iron oxide and that a major portion of the acid mixture goes to this purpose. Consequently, for example, 1.8% of the iron oxide was leached out in the present experiment. Thus it seems necessary in each individual case to determine the requisite acid quantity through empirical experimentation.

Later experiments with hematite slime have shown that equally effective, or in certain cases somewhat better, purification is achieved with the method described hereinabove.

We claim:

1. A method for purifying iron oxide from a quartz-containing iron ore, to an $SiO_2$ content that does not exceed 0.03% by weight, comprising:
   (a) contacting a finely divided quartz-containing iron oxide ore with an alkali carbonate in an amount sufficient to obtain an alkali oxide/($SiO_2+Al_2O_3$) mole ratio of about 0.5-2.0;
   (b) calcinating said quartz-containing iron oxide ore with said alkali carbonate at a temperature of about 850°-1000° C. for a time sufficient to melt the alkali carbonate;
   (c) leaching said calcinated ore at room temperature with a weak aqueous solution of at least one acid selected from the group consisting of hydrochloric acid, hydrofluoric acid, sulfuric acid and nitric acid until the $SiO_2$ content of the ore is less than 0.03% by weight.

2. The method of claim 1, wherein the alkali carbonate is $Na_2CO_3$.

3. The method of claim 1, wherein the iron ore is prepared from a slime selected from the group consisting of magnetite, hematite and mixtures thereof.

4. The method of claim 1, wherein the iron ore contains a trivalent iron selected from the group consisting of hematite ($\alpha$-$Fe_2O_3$), goethite ($\alpha$-FeOOH), and mixtures thereof.

5. The method of claim 1, wherein the leaching solution comprises 8 grams/liter hydrofluoric acid and 20 grams/liter of hydrochloric acid, and wherein the amount of leaching solution is about 4 times the weight of the calcinated ore.

6. The method of claim 1, wherein the amount of acid leaching solution is about 10 times the amount required to dissolve the impurities in the iron oxide.

7. The method of claim 2, wherein the calcination is carried out with a mechanical mixture of iron oxide and sodium carbonate.

8. The method of claim 2, wherein the calcination is carried out with granules or pellets prepared from the iron oxide and sodium carbonate.

* * * * *